United States Patent [19]

Linder et al.

[11] Patent Number: 5,024,765
[45] Date of Patent: Jun. 18, 1991

[54] COMPOSITE MEMBRANES AND PROCESSES USING THEM

[75] Inventors: Charles Linder, Rehovot; Mordechai Perry, Petach Tikva; Mara Nemas, Neve Monosson; Reuven Katraro, Rishon Lezion, all of Israel

[73] Assignee: Aligena AG, Basel, Switzerland

[21] Appl. No.: 416,224

[22] Filed: Oct. 2, 1989

[51] Int. Cl.⁵ ............................................. B01D 69/12
[52] U.S. Cl. ..................................... 210/651; 210/654; 210/490; 210/500.44
[58] Field of Search .................... 210/654, 500.43, 490, 210/500.37, 500.41, 500.35, 500.36, 651; 427/245, 246; 525/349

[56] References Cited

U.S. PATENT DOCUMENTS

| | | | |
|---|---|---|---|
| 3,556,305 | 1/1971 | Shorr | 210/490 X |
| 3,567,810 | 3/1971 | Baker | 210/490 |
| 3,615,024 | 10/1971 | Michaels | 210/500.45 X |
| 3,951,815 | 4/1976 | Wrasidlo | 210/490 X |
| 4,029,582 | 6/1977 | Ishii et al. | 210/490 |
| 4,125,462 | 11/1978 | Latty | 210/490 X |
| 4,244,817 | 1/1981 | Yaginuma | 210/490 X |
| 4,246,092 | 1/1981 | Perry et al. | 210/640 |
| 4,360,434 | 11/1982 | Kawaguchi | 210/490 |
| 4,477,634 | 10/1984 | Linder et al. | 525/349 X |
| 4,690,765 | 9/1987 | Linder et al. | 210/654 |
| 4,704,324 | 11/1987 | Davis et al. | 210/500.43 X |

FOREIGN PATENT DOCUMENTS

| | | |
|---|---|---|
| 8945 | 3/1980 | European Pat. Off. . |
| 0010425 | 4/1980 | European Pat. Off. . |
| 25973 | 4/1981 | European Pat. Off. . |
| 26399 | 4/1981 | European Pat. Off. . |
| 2855775 | 7/1979 | Fed. Rep. of Germany . |
| 1118817 | 1/1972 | France . |
| 2166382 | 8/1973 | France . |
| 2000720 | 1/1979 | United Kingdom . |
| 1558807 | 1/1980 | United Kingdom . |
| 2027614 | 2/1980 | United Kingdom . |

OTHER PUBLICATIONS

Office of Saline Water R&D Progress Report No. 359 Oct. 1967.
Sourirajan (Ed.) Reverse Osmosis and Synthetic Membranes.

Primary Examiner—Frank Spear
Attorney, Agent, or Firm—Michael L. Keller

[57] ABSTRACT

A composite membrane which comprises:
(a) a porous semipermeable membrane substrate; and
(b) a coating superimposed thereon which includes at least one member selected from:
 monomers containing at least one diazonium group,
 polymers containing at least one diazonium group,
 monomers containing at least one primary amino group and which have been exposed to the action of at least one member selected from nitrous acid and other reagents which potentially react with primary amine groups to form diazonium groups, and
 polymers containing at least one primary amino group and which have been exposed to the action of at least one member selected from nitrous acid and other reagents which potentially react with primary amine groups to form diazonium groups; and wherein the coating has been subjected to at least one in situ chemical reaction with loss of any diazonium groups which may be present, and with formation of valence links in at least one of the modes (i), (ii) and (iii), namely:
 (i) among different moieties of the at least one member between themselves;
 (ii) between moieties of the at least one member and the material of the substrate; and
 (iii) between moieties of the at least one member and a polyfunctional reactant.

34 Claims, No Drawings

COMPOSITE MEMBRANES AND PROCESSES USING THEM

FIELD AND BACKGROUND OF THE INVENTION

The present invention relates to composite membranes based on porous semipermeable membrane substrates, and to processes using such composite membranes.

Composite membranes, in which a thin crosslinked hydrophilic film is chemically bound to a thicker more porous membrane, are known, see e.g. EP 25973 and 26399. These membranes require reactive groups in the substrate to chemically bind the thin film thereto, and crosslinking e.g. with reactive dye. Without this chemical binding, the coated polymer crosslinked with reactive dye had a relatively short life, especially at extremes of pH and temperature, and also suffered from the disadvantage that it was soluble in various organic solvents such as N-methylpyrrolidone (NMP), dimethylformamide (DMF) or dimethylsuloxide (DMSO). One approach to coating an ultrafiltration membrane with hydrophilic polymers, for improving rejection to undesired solutes, is described in U.S. Pat. No. 4,125,462. The coating polymers are water-soluble amine group containing polymers which are adsorbed physically, without any attempt at crosslinking or binding the coated layers.

An object of the present invention is to provide composite membranes of superior flux and separation capacity. Other objects of the invention are processes utilizing such membranes for concentrating or purifying liquids. Further objects of the invention will appear from the description which follows.

SUMMARY OF THE INVENTION

The present invention accordingly provides a composite membrane which comprises:
(a) a porous semipermeable membrane substrate; and
(b) a coating superimposed thereon which includes at least one member selected from:
monomers containing at least one diazonium group,
polymers containing at least one diazonium group,
monomers containing at least one primary amino group and which have been exposed to the action of at least one member selected from nitrous acid and other reagents which potentially react with primary amine groups to form diazonium groups, and
polymers containing at least one primary amino group and which have been exposed to the action of at least one member selected from nitrous acid and other reagents which potentially react with primary amine groups to form diazonium groups; and wherein the coating has been subjected to at least one in situ chemical reaction with loss of any diazonium groups which may be present, and with formation of valence links in at least one of the modes (i), (ii) and (iii), namely:
(i) among different moieties of the at least one member between themselves;
(ii) between moieties of the at least one member and the material of the substrate; and
(iii) between moieties of the at least one member and a polyfunctional reactant.

In a preferred aspect of the composite membrane of the invention, at least one in situ chemical reaction has been effected in at least mode (iii), this reaction being carried out in such manner as to leave residual reactive functions; and the composite membrane further comprises:
(c) a polymer selected from hydrophilic and polyelectrolyte polymers, which polymer has been reacted with the aforementioned residual functions and subsequently has been subjected to reaction with at least one crosslinking agent.

DETAILED DESCRIPTION OF THE INVENTION

The initial membrane substrates useful in the present invention may be reverse osmosis, ultrafiltration or microporous membranes with average pore sizes varying from 10 to 5000 Å, preferably from 10 to 1000 Å, and more preferably from 20 to 200 Å, for the achievement of maximum rejection and flux. Moreover, a minimum porosity of 10% is preferred, in order to achieve a sufficiently high flux. Any of the known membrane-forming materials may be used, such as for example, olefin homopolymers and copolymers, acrylonitrile homopolymers and copolymers, polyamides, polyvinyl chloride homopolymers and copolymers, cellulosics, epoxy resins, polyarylene oxides, polycarbonates, polyether-ketones, polyetherether ketones, polyheterocyclics, copolymers containing heterocyclic rings, polyvinylidene fluoride, polytetrafluoroethylene, polyhexafluoropropylene, polyesters, polyimides, aromatic polysulfones and polyelectrolyte complexes. It is of course to be understood that homopolymers and copolymers may be used even where not specifically mentioned, and that the term "copolymers" includes terpolymers, quadripolymers and those made from five or more different monomers. Porous ceramic substrates (e.g. those made from alumina) may be used as an alternative to those made from synthetic or artificial polymers. Preferred substrate membrane-forming materials are cellulosics, polyacrylonitriles, aromatic polysulfones, polyamides, polyvinylidene fluoride, polyterafluorethylene and polyether-ketones, as well as ceramics.

The substrate may be prepared by casting from solution. For casting procedures reference may be made to e.g. U.S. Pat. No. 4,029,582, GB 2,000,720, Office of Saline Water R & D Progress Report No. 359, October 1967, U.S. Pat. Nos. 3,556,305, 3,615,024, 3,567,810, and "Reverse Osmosis and Synthetic Membranes" Ed. Sourirajan. Thus, for example, the polymer may be dissolved in a suitable solvent (or mixture of solvents), such as NMP, DMF, DMSO, hexamethylphosphoramide, N,N-dimethylacetamide or dioxan (or any of these containing additives such as cosolvents, partial solvents, non-solvents, salts, surfactants or electrolytes. Such additives, which may be exemplified by (e.g.) acetone, ethanol, methanol, formamide, water, methylethylketone, triethyl phosphate, sulfuric acid, HCl, partial esters of fatty acids, sugar-derived alcohols and their ethylene oxide adducts, sodium dodecyl sulfate (SDS), sodium dodecylbenzene sulfonate, NaOH, KCl, $ZnCl_2$, $CaCl_2$, $LiNO_3$, LiCl and $Mg(ClO_4)_2$, may alter or modify the membrane morphology, and its flux and rejection properties. Suspended particles may be removed from the casting solution by known methods, such as by pressure filtration through microporous filters, or by centrifugation. The solution may then be cast on a support material such as glass, metal, paper or plastic, from which it may be removed.

It is presently preferred, however, to cast the solution onto a porous support material from which the membrane is not removed. Such porous support materials may be woven or nonwoven textile materials e.g. those made from cellulosics, polyethylene, polypropylene, nylon, vinyl chloride homopolymers and copolymers, polystyrene, polyesters such as polyethylene terephthalate, polyvinylidene fluoride, polytetrafluoroethylene, polyether-ketones, glass fibers, porous ceramics and chomers.

The concentration of polymer in the casting solution may vary as a function of its molecular weight, and may depend on the presence or absence of additives. Typical concentrations lie within the range of 5 to 80%, preferably between 10 and 50%, and more preferably between 15 and 30% wt./vol. The casting temperature may vary from e.g. $-20°$ to $100°$ C., preferably between $0°$ and $60°$ C., and may depend on the nature of the polymer, its molecular weight, and the presence or absence of cosolvents and other additives.

The casting solution may be applied to the abovementioned supports by known techniques. The wet film thickness may vary between 5 and 2000, preferably between 50 and 800, more preferably between 100 and 500 microns. The wet film and support may then be immersed immediately, or after a partial evaporation step (e.g. from 5 seconds to 48 hours), under (e.g.) ambient conditions, or at an elevated temperature, and/or under vacuum, in a gelling bath of a non-solvent. Such baths are usually water, which may contain a small percentage of e.g. a solvent such as DMF or NMP, and/or a surface active agent such as SDS, the bath being preferably at a temperature within the range of $0°$ to $70°$ C. A commonly used gelling bath is, for example, water containing 0.5% SDS at $4°$ C. In another mode of forming substrate membranes, a polymer solution containing a component that may be leached out by water or another solvent is cast and dried prior to immersion; on immersion, leachable material is removed resulting in a porous membrane. According to another mode of operation, a polymer solution not containing leachable material is cast and dried, resulting in a porous membrane by virtue of the physico-chemical properties of the polymeric material, in which case (e.g.) a porous structure results from a combination of solvents and/or a subsequent chemical reaction.

The at least one member of the coating may be (prior to exposure to at least one member selected from nitrous acid and other reagents which potentially react with primary amine groups to form diazonium groups and/or prior to conversion to diazonium-containing entities) an aromatic or aliphatic primary amine; groups which impart desirable properties, e.g. hydrophilicity, may also be present, examples of such groups being hydroxyl, thiol, carboxylic, sulfonic, carbazic and ether groups. Amino groups other than primary may also be present. Aromatic amines may comprise one or more unfused rings or a fused ring systems containing 2, 3, 4 or more fused rings, and comprise one or more primary amino groups desirably directly attached to one or more aromatic rings. Examples are aniline, m- or p-phenylenediamine, diaminonaphthalenes, and aminohydroxynaphthalenedisulfonic acids. Aliphatic (including cyclic aliphatic), aromatic and heterocyclic polymers (including oligomers) containing amine functions (at least part of which must be primary amines, but part may also be secondary and/or tertiary amines) may also be used. Examples are polyethyleneimine (MW in the range $150-2\times10^6$), possibly partially alkylated or otherwise modified, polyvinylamine (MW in the range $1000-2\times10^6$), polybenzylamines, polymers of 2-aminoethyl methacrylate, polyvinylimidazoline, amine modified polyepihalohydrins (described in GB 1,558,807), polydiallylamine derivatives, polymers containing piperidine rings (described in GB 2,027,614A), amino polysufones, amino polyarylene oxides (e.g. aminomethylated polyphenylene oxide), polyamide/polyamine/epichlorohydrin condensation products, hydrophilic amino-polymers described in EP 8945, and the condensation products of dicyandiamide, amine salts (e.g. ammonium chloride) and formaldehyde. The foregoing polymers may be in part a copolymer or a polymer containing other monomeric units, block polymers, or graft polymers, and other monomeric units present (as copolymers or otherwise) may contain the ionic groups $-SO_3^-$, $-COO^-$ or $-N(R)_3^+$. Preferred polymers are polyaliphatic (acyclic or cyclic) amines such as polyethyleneimines. The polyethyleneimines, which include primary amine groups, as well as secondary and tertiary amine groups, preferably have MW between 1000 and 200,000, more preferably between 10,000 and 70,000, although oligomers of MW between 150 and 1000 may also be used. Generally speaking, the use of such oligomers does not give as great an increase in solute rejection in the final membrane, as when higher molecular weight polymers are used. There may alternatively be used water soluble amphoteric or block mosaic polymers containing both cationic and anionic groups, together with primary amine functions. The amino-polymers may be exposed to the action of at least one member selected from nitrous acid and other reagents which potentially react with primary amine groups to form diazonium groups; when using nitrous acid, for example, this may be effected by (e.g.) dissolving in a sodium nitrite solution and adjusting the pH to less than 2 (preferably to between 0.5 and 1.5). While the present invention is in this respect not to be construed as restricted by any theory, it is possible that even in the case, of non-aromatic amines which do not form stable diazonium derivatives, there may be formed such derivatives at least transiently. Thus other reagents and conditions which may be expected to give diazonium groups (whether transient or otherwise) may be used instead of the foregoing specified procedure. By way of example only, such other reagents may be alkyl or acyl nitrite esters, nitrous anhydride, NOCl, NOBr, and nitrosonium salts e.g. $NO^+(HSO_4)^-$, $NO^+(ClO_4)^-$ and $NO^+(BF_4)^-$. Water is the preferred solvent in this step, although other solvents such as low molecular weight alcohols or ketones may be used alone, or in combination with water. The concentration of monomer or polymer may be e.g. in the range of from 0.1 to 30%, preferably between 0.5 and 15%, more preferably between 0.5 and 5%, wt./vol. In one alternate method of practising the invention, the polyamines (monomers or polymers) may be exposed to the nitrous acid or the other reagents referred to, after being coated onto the substrate.

The substrate may be immersed in a solution of the at least one member, as a means of applying coating (b) to substrate (a), the latter then being removed and drained. In order to effect the at least one in situ chemical reaction described herein, the coated substrate may then be immersed in a solution having a basic pH, i.e. above 7 and preferably above 10. It may be noted that the in situ chemical reaction, besides forming valence links as already mentioned, may have the additional effect of replacing primary amine and/or diazonium functions originally present in the at least one member by hydroxy and/or azo functions. The time of immersion in the basic solution may vary from 30 seconds to 48 hours, preferably from 1 minute to 4 hours; after immersion, the membrane is rinsed at pH 4 to 7 to remove unreacted material and to restore the membrane to a neutral condition.

In a preferred embodiment, the at least one in situ chemical reaction is effected at least with a polyfunctional reactant (which may be ionic or nonionic). This polyfunctional reactant is in particular capable of creating bonds with the reactive functions in the coating. Such reactants possess their reactivity by virtue of the presence of reactive multiple bonds, and/or epoxide, aziridine, aldehyde, imidate, isocyanate, isothiocyanate, hydroxyl, carboxylic anhydride, acyl halide, carbonic imide halide and N-methylol groups, and/or by virtue of the presence of detachable tertiary amine groups (or quaternary groups such as Me$_4$N— or pyridinium, from which tertiary amines may be detached) and/or of other leaving groups (e.g. anions, especially halides); reactive groupings including moieties such as —C=C—, —CO—C≡C— or —SO$_2$—C=C— may be present. The leaving groups may possess their reactivity by virtue of the influence of e.g. electrophilic groups, such as —CO— or —SO$_2$—, in saturated aliphatic radicals; of a quaternary nitrogen atom such as in the group —≡$\overset{\oplus}{N}$—CH$_2$CH$_2$Cl; or of electrophilic groups, in the o- or p-position in aromatic radicals, such as nitro, hydrocarbonsulfonyl or hydrocarboncarbonyl groups, or of the bond to a ring carbon atom, which is adjacent to a tertiary nitrogen ring atom as in a halogenotriazine or halogenopyrimidine compound.

Examples of nonionic polyfunctional reactants which are advantageous are cyclic carbonic acid imide-halides, and in particular halogeno-diazines or -triazines containing at least two reactive substituents, as well as compounds containing isocyanate or isothiocyanate groups. Especially advantageous are tetrachloropyrimidine and cyanuric chloride. The cyclic carbonic acid imide-halides may be, for example:

A. s-Triazines containing at least two identical or different halogen atoms bonded to carbon atoms, e.g. cyanuric chloride, fluoride or bromide, and also primary condensation products of any of these cyanuric halides with water, ammonia, amines (e.g. alkylamines, anilines), alkanols, alkylmercaptans, phenols or thiophenols.

B. Pyrimidines containing at least two reactive, identical or different halogen atoms, such as 2,4,6-trichloro-, 2,4,6-trifluoro- or 2,4,6-tribromo-pyrimidine, which can be further substituted in the 5-position, e.g. by an alkyl, alkenyl, phenyl, carboxyl, cyano, nitro, chloromethyl, chlorovinyl, carbalkoxy, carboxymethyl, alkylsulfonyl, carbamoyl or sulfamoyl group, but preferably by halogen, for example, chlorine, bromine or fluorine; particularly suitable halogenopyrimidines are 2,4,6-trichloro- and 2,4,5,6-tetrachloropyrimidine, and derivatives of pyrimidine similar to those of group A, above.

C. Halogenpyrimidinecarboxylic acid halides, e.g. dichloropyrimidine-5- or -6-carboxylic acid chloride.

D. 2,3-Dihalogeno-quinoxaline-, -quinazoline-, or -phthalazine-carboxylic or -sulfonic acid halides, such as e.g. 2,3-dichloroquinoxaline-6-carboxylic acid chloride or bromide.

E. 2-Halogeno-benzothiazole- or -benzoxazole-carboxylic acid halides or -sulfonic acid halides, e.g. 2-chlorobenzothiazole-or -benzoxazole-5- or -6-carboxylic acid chloride or -5- or -6-sulfonic acid chloride.

F. Halogeno-6-pyridazonyl-1-alkanoyl halides or 1-benzoyl halides, 4,5-dichloro-6-pyridazonyl-1-propionyl chloride or -1-benzoyl chloride.

Further compounds which contain at least two reactive substituents and can be employed, are, for example:

G. Anhydrides or halides of aliphatic, α,β-unsaturated mono- or di-carboxylic acids having preferably 3 to 5 carbon atoms, such as maleic anhydride, acryloyl chloride, methacryloyl chloride and propionyl chloride.

H. Carboxylic acid anhydrides or halides of aliphatic mono- or di-carboxylic acids having preferably 3 to 10 carbon atoms, or of aromatic carboxylic acids, containing reactive halogen atoms e.g. chloroacetyl chloride, β-chloropropionyl chloride, α,β-dibromopropionyl chloride, α-chloro- or β-chloro-acryloyl chloride, chloromaleic anhydride and β-chlorocrotonoyl chloride, and fluoro-nitro- or chloro-nitro-benzoic acid halides or -benzenesulfonic acid halides, in which the fluorine atom or the chlorine atom is in the o-position and/or p-position relative to the nitro group.

I. Carboxylic acid N-methylolamides or reactive functional derivatives of these methylol compounds. Carboxylic acid N-methylolamides are in particular N-methylol-chloroacetamide, N-methylol-bromoacetamide, N-methylol-α,β-dichloro- or -dibromo-propionamide, N-methylol-acrylamide, and N-methylol-α-chloro- or -α-bromo-acrylamide. Reactive derivatives of the carboxylic acid N-methylolamides, are e.g. the corresponding N-chloromethyl- or N-bromomethyl-amides.

J. Free or etherified N-methylolureas or N-methylolmelamines, e.g. N,N-dimethylolurea and its dimethyl ether, N,N'-dimethylolethylene- or propylene-urea, 4,5-dihydroxy-N,N'-dimethylolethyleneurea or 4,5-dihydroxy-N,N'-dimethylolethyleneurea dimethyl ether and di- to hexamethylolmelamine, trimethylolmelamine dimethyl ether, pentamethylolmelamine di- or tri-methyl ether, and hexamethylolmelamine penta- or hexa-methyl ether.

K. Condensation products of diarylalkanes containing at least one phenolic hydroxyl group and halogenhydrins, for example the diepoxide obtained from 2,2-bis-(4hydroxyphenyl)propane and epichlorohydrin, as well as glycerol triglycidyl ethers and also corresponding diaziridines.

L. Dialdehydes, e.g. glutaraldehyde or adipaldehyde.

M. Diisocyanates or diisothiocyanates such as (C$_{2-4}$-alkylene) diisocyanates e.g. ethylene diisocyanate; (optionally C$_{1-4}$-alkyl substituted) phenylene diisocyanates or diisothiocyanates, e.g. phenylene-1,4-diisocyanate, toluene-2,4-diisocyanate or phenylene-1,4-diisothiocyanate.

N. Further reactive compounds such as (tris-acryloyl)hexahydro-s-triazine, epoxides or aziridines.

Preferred ionic polyfunctional reactants are ionic or charged derivatives of triazinyl or pyrimidinyl compounds. Reactive azo dyes (containing sulfonic acid, carboxyl or ammonium groups) belong to this class as do non-colored compounds with the aforementioned functions. An effective reactant may crosslink via chemical bonds, electrostatic interactions of ionic groups, and by chelation or coordination of polymeric functions with metal ions. The preferred mode of crosslinking is via a covalent bond, although the other two modes may also be used. In some cases all three modes of crosslinking may be operative via application of a single component (e.g. the dye of formula 101) or may be reached by sequential or parallel application of two or three different compounds (dyestuff and metal salt).

Multivalent metal salts that may find application in crosslinking said coating via chelation or coordination bonds are for example, $CuSO_4$, $CrCl_3$ and $FeCl_3$. These salts may be applied alone, in combination with each other, or in combination with covalent (ionic) binding compounds.

Included within the scope of this invention are also ionic polyfunctional reactants containing such reactive groups as epoxides, aziridines, anhydrides, and preferably cyclic carbonic acid imide halides (cyanuric chloride or tetrachloropyrimidine), dihalides of dicarboxylic acids, dialdehydes or trihalides of tricarboxylic acids. While many of these reactants can be applied in aqueous solutions within a narrow range of pH and temperature, the acyl halides must be dissolved in aprotic solvents.

The ionic reactive dyes, which can belong to various categories, for example, anthraquinone, formazan or preferably azo-dyes, which are optionally metal complexes. Suitable reactive groups (which are part of the dyes) are the following: carboxylic acid halides, sulfonic acid halides, radicals of $\alpha,\beta$-unsaturated carboxylic acids or amides, e.g. of acrylic acid, methacrylic acid, $\alpha$-chloroacrylic acid, $\alpha$-bromoacrylic acid or acrylamide radicals, preferably of low halogenoalkanecarboxylic acids, e.g. of chloroacetic, $\alpha,\beta$-dichloropropionic or $\alpha,\beta$-dibromopropionic acid; radicals of fluorocyclobutanecarboxylic acids, e.g. of tri- or tetrafluorocyclobutanecarboxylic acids; radicals containing vinyl-acyl groups, e.g. vinyl sulfone or carboxyvinyl groups; radicals containing ethylsulfonyl (e.g. $HO_3SOCH_2CH_2SO_2-$ or $ClCH_2CH_2SO_2-$) or ethylsulfamoyl groups (e.g. $HO_3SOCH_2CH_2NHSO_2-$) and halogenated heterocyclic radicals such as dihaloquinoxalines, dihalopyridazonyl, dihalophthalazines, halobenzothiazoles and preferably halogenated pyrimidines or 1,3,5-triazines such as monohalotriazines, dihalotriazines, 2,4-dihalopyrimidines or 2,4,6-trihalopyrimidines. Suitable halogen atoms are fluorine, bromine and especially chlorine atoms.

Ionizable groups, which the membrane-modifying substances can contain are, for example, sulfato, sulfonic acid, carboxylic acid, ammonium (formed from primary, secondary or tertiary amino groups), quaternary ammonium, phosphonium or sulfonium groups. Particularly advantageous results are achieved with substances containing sulfonic acid groups.

The preferred reactive groups present in the ionic polyfunctional reactants are monochlorotriazinyl, dichlorotriazinyl, 2,4-dichloropyrimidinyl, 2,3-dichloroquinoxaline-6-carbonyl, 4,5-dichloropyridazonylpropionyl, 1,4-dichlorophthalazine-6-carbonyl, chlorobenzothiazole linked to the dye via $-CONH-$, $-SO_2NH-$, $-NH-Ar-N=N-$ (Ar=phenylene or naphthylene), 5-chloro-4-methyl-2-methylsulfonylpyrimidinyl, vinylsulfonyl, $\beta$-sulfatoethylsulfonyl, $\beta$-sulfatoethylsulfamoyl, $\beta$-chloroethylsulfonyl, or $\beta$-sulfatopropionamido.

Especially preferred are reactive azo dyestuffs containing sulfonic acid or carboxyl groups, either of which may be present in salt form, such as alkali metal (e.g. Na) salts, and reactive groups such as monochlorotriazinyl, dichlorotriazinyl, 2,4-dichloropyrimidinyl, vinylsulfonyl, $\beta$-sulfatoethylsulfonyl, $\beta$-sulfatoethylsulfamoyl, or $\beta$-chloroethylsulfonyl radicals.

The inventive composite membranes, when containing a polymeric (or oligomeric) layer modified by an azo dye containing sulfonic acid groups, are particularly valuable and versatile in use. The azo dye can also contain a metal, for example copper, bonded in the form of a complex.

The ionic or nonionic polyfunctional reactants can be applied e.g. from aqueous solutions or suspensions containing from 0.1 to 20% reactant(s) to the coated substrate. Preferably these solutions contain from 0.5 to 10%, more preferably from 0.5 to 5% by weight of reactant(s). Their proportion to the coated membrane substrate is about (0.5-10) :1, preferably (0.5-5): 1.

By way of an example for the reaction of a polyethyleneimine coating which has been exposed to the action of nitrous acid and which has been subjected subsequently to alkaline pH, and contains hydroxyl as well as amino groups, with an aqueous acetone solution/suspension of cyanuric chloride, in an amount of 0.5 to 5 parts cyanuric chloride per part of coated membrane substrate, the reaction temperature is preferably kept below 4° C., e.g. at about 0° C., in order to prevent hydrolysis of the cyanuric chloride; the pH value range is approximately between 8 and 11 and the reaction time can be from 1 minute to 5 hours.

When both nonionic and ionic polyfunctional reactants are used, the ionic reactants are as a rule applied first, followed by the nonionic reactants. If there are already ionic groups present in the coating polymers (e.g. anionic groups, or both anionic and cationic groups in amphoteric polymers) the introduction of further charges into the surface of the membrane is not necessary; a crosslinking step with nonionic reactants is in this case sufficient.

Unlike the state of the art practised in the manufacture of composite RO membranes, the reaction with polyfunctional reactants (and incidentally incorporation of ionic groups) may preferably be carried out in aqueous medium. Thus, water-soluble or partially water-soluble multifunctional reactants have been found to give good results under these conditions.

The ionic polyfunctional reactants serve to introduce positively or negatively charged (ionic) groupings, into the membrane external and/or internal (pore) surfaces, and to crosslink the membrane; these objectives can be achieved in either one or two stages.

The one-stage process means that the reactants incorporating the ionic groupings, and the fixing agent such as alkali, are used in a single bath. The two-stage process comprises the steps of (1) adsorption of the reactant which incorporates the ionic groupings and (2) fixing, i.e. effecting reaction between the polyfunctional reactant and (at least) the coating, in a separate bath. The two-stage process is preferred since on the one hand, the concentration of the polyfunctional reactant in the adsorption solution can be kept lower, and a solution of this type can optimally be used several times, while on the other hand, the total reaction time is shorter than in the case of the one-stage process.

In the two-stage process, the concentration of e.g. a reactive dye in aqueous solution can be from about 0.5 to about 3%; the adsorption is carried out, for example, at temperatures of from 20° to 35° C. over a period of 2 to 60 minutes. The pH value can be e.g., between 4 and 8. Fixing can then be carried out in an aqueous solution, the pH of which has been adjusted to between 9 and 12, and the reaction time can be approximately 30 minutes. The pH is adjusted to the desired value using any suitable inorganic bases, e.g. sodium carbonate, or alternatively, suitable organic bases.

After the application of the polyfunctional reactant, a second polymer coating which includes at least one hydrophilic or polyelectrolyte polymer (or oligomer) is applied. Preferred such polymers are polyfunctional polymers or oligomers which contain active hydrogen atoms bound to nitrogen, oxygen or sulfur atoms. The nitrogen atoms may be present as aliphatic (acylic or cyclic), aromatic or heterocyclic amino groups, which may be primary, secondary or tertiary. Alternatively or additionally, these polymers and oligomers may contain -OH and/or -SH functions. Examples of such polymers or oligomers are polyethyleneimine (MW in the range $150-2\times10^6$), possibly partially alkylated or otherwise modified, polyvinylamine (MW in the range $1000-2\times10^6$), polyvinyl alcohol (MW in the range 2000 to 200,000) which may be partially esterified, polyvinylanailine, polybenzylamines, polyvinyl mercaptan, polymers of 2-hydroxyethyl or 2-aminoethyl methacrylates, polyvinylimidazoline, amine modified polyepihalohydrins (described in GB 1,558,807), polydiallylamine derivatives, polymers containing piperidine rings (described in GB 2,027,614A), amino polysulfones, amino polyarylene oxides (e.g. aminomethylated polyphenylene oxide), polyamide/polyamine/epichlorohydrin condensation products, hydrophilic amino-polymers described in EP 8945, and the condensation products of dicyandiamide, amine salts (e.g. ammonium chloride) and formaldehyde. The foregoing polymers may be in part a copolymer or a polymer containing other monomeric units, block polymers, or graft polymers, and other monomeric units present (as copolymers or otherwise) may contain the ionic groups $-SO^-$, $-COO^-$ or $-N(R)_3{}^+$. Preferred polymers are polyaliphatic (acylic or cyclic) amines such as polyethyleneimines. The polyethyleneimines, which include primary amine groups, as well as secondary and tertiary amine groups, preferably have MW between 1000 and 200,000, more preferably between 10,000 and 70,000, although oligomers of MW between 150 and 1000 may also be used. Generally speaking, the use of such oligomers does not give as great an increase in solute rejection in the final membrane, as when higher molecular weight polymers are used.

In another preferred embodiment, there may be used water soluble amphoteric or block mosaic polymers containing both cationic and anionic groups (thereby affording a mixed charge composite membrane), together with reactive functions such as $-NH_2$ or $-OH$, for subsequent reaction with a crosslinking agent. The thus-formed membranes are particularly useful for separating salts from relatively low molecular weight organic solutes. An example of such a polymer is poly(-vinylamine/vinyl sulfonate) or an at least partially quaternized derivative thereof.

Water is the preferred medium for application of the second polymer coating, i.e. after application of the polyfunctional reactant, although other solvents such as low molecular weight alcohols or ketones may be used alone or in combination with water. The coated substrate which has been reacted with polyfunctional reactant may be immersed in a solution of the second polymer. The range of polymer concentration may be from 0.1 to 80%, but is preferably between 1 and 30%, most preferably between 1 and 15%. Liquid polymers can be used alternatively in absence of solvents. The concentration of polymer needed to achieve optimum rejection and flux characteristics in the final composite membrane is a function of the nature of the polymer, its molecular weight and molecular dimensions, membrane porosity and pore size, temperature, time of immersion, pH and subsequent washing steps. These factors (together with a rinse step after immersion) control the thickness of the polymer layer deposited on the membrane. The temperature of the polymer solution during membrane immersion may vary from 0° to 90° C. The optimum temperature is a function of adsorption rates. The time of immersion may vary between 1 minute and 48 hours, as a function of the temperature, pH, concentration and the MW, dimensions and solution properties of the second polymer. For example, at a pH of 8.0 and room temperature, and where the second polymer is polyethyleneimine applied as a 10% solution in water, and the substrate comprises a polysulfone membrane, a time of 1 to 5 minutes has been found to be adequate for the practise of the invention. On the other hand, poly(aminostyrene) should be used for one hour immersion in order to achieve optimum rejection and flux characteristics.

The pH of the polymer solution may be adjusted to control polymer solubility, the rate of reaction of the polymer with reactive groups in the coating and the quantity of polymer adsorbed. Thus, for amines, a pH above 7.0 increases nucleophilic reaction rates; a pH range between 7 and 10.0 is optimum in most cases, although the use of higher or lower pH values is not excluded. If a lower pH value is used in order to increase solubility of a basic polymer, a given time is allowed for adsorption of the polymer, and then the pH is increased to above 7.0 for binding.

After immersion the composite membrane at this point is generally rinsed to remove excess polymer. This step is related to the degree of adsorption of the polymer from the solution, its concentration therein and membrane porosity. The time of rinsing may e.g. vary from 1 minute to 48 hours, but is preferably from 30 minutes to 4 hours, when a 10% polyethyleneimine solution has been used for 5 minutes. Excessive washing or rinsing results in final membranes with lower than maximum rejections, but still higher than unmodified substrate. A relatively shorter rinsing time leaves a relatively thick deposit of polymer and results in a relatively low flux. The pH and temperature of the rinsing solution may vary between 1 and 12, and from 0° to 100° C., respectively. Shorter rinsing times are required at higher temperatures, and the required time may also vary as a function of pH.

It is presently preferred that the initial coating has been coated onto substantially the whole of the external and internal surfaces of the substrate. Moreover, it is preferred that the at least one in situ chemical reaction has been effected in at least mode (iii), that the chemical reaction with the polyfunctional reactant has been carried out in such manner as to leave residual reactive functions; and that the composite membrane further comprises:

(c) a polymer selected from hydrophilic and polyelectrolyte polymers, which polymer has been reacted with the residual functions and subsequently has been subjected to reaction with at least one crosslinking agent.

Such crosslinking agent for polymer (c) contains at least two reactive functional groups. These agents can be selected from the previously described polyfunctional reactants, and may be applied also as previously described. It is also particularly preferred that polymer (c) contains functions selected from the group of cations, anions, —NH—, —NH$_2$—, —OH and —SH.

At least one of components (a) and (c) (and in a particular embodiment both of them) may be derived from polyethyleneimine. It will also be appreciated from the foregoing description that at least one of the polyfunctional reactant and the crosslinking agent may include a reactive dye.

The composite membrane of the present invention is useful in reverse osmosis and ultrafiltration, and in particular in fields involving concentration and purification of liquids, e.g. separating salts from organic compounds and purifying waste water. A particular application of the present membranes lies in the range of pressures (5 to 50 bar) and MW cut-offs (100 to 2000) associated with membranes between reverse osmosis and ultrafiltration, with average pore sizes from 1 to 500 Å, preferably from 10 to 100 Å. The present membranes exhibit an improvement in rejection of unwanted solutes, with minimum flux decline, and greater rejection stability over a period of time, whereas in merely coated membranes, such as those of U.S. Pat. No. 4,125,462, rejection decreases more markedly with time. While the present invention is not to be construed as limited by any theory, it is presently believed that the minimum membrane thickness need to achieve maximum rejection is fixed by the crosslinking step or steps, and moreover that when two types of crosslinkers, ionic and nonionic, are used, then the resultant membranes give improved separation of the rejected solute and low molecular weight salt molecules, as well as enhanced lives at high pH and temperatures, as compared with use of a single type of crosslinker. It has moreover been found in accordance with the present invention, that the at least one in situ chemical reaction of the at least one member affords superior flux and separation properties compared with prior art membranes in which an analogous layer (e.g. one containing amine groups) is not subjected to chemical reaction.

The at least one in situ chemical reaction may be effected, e.g. by immersion of the coated substrate in a bath of given pH (for example, pH 11), or by exposure to a basic gaseous stream, such as one comprising ammonia gas.

It will be appreciated by those skilled in the art that, depending on the nature of the intended use, the composite membrane of the invention may be formed as (e.g.) sheets, leaves, tubes, pockets, bags, cones, hollow fibers or tubelets, and may be so fabricated that a support is not required for practical use. Thus, the present invention provides in a particular embodiment, a shaped composite membrane which comprises the following components (a), (b) and (c), namely:

(a) a porous semipermeable membrane substrate;

(b) a superimposed coating thereon which has been coated onto substantially the whole of the external and internal surfaces of the substrate, the coating including at least one member selected from:
monomers containing at least one diazonium group,
polymers containing at least one diazonium group,
monomers containing at least one primary amino group and which have been exposed to the action of at least one member selected from nitrous acid and other reagents which potentially react with primary amine groups to form diazonium groups, and polymers containing at least one primary amino group and which have been exposed to the action of at least one member selected from nitrous acid and other reagents which potentially react with primary amine groups to form diazonium groups, and wherein the coating has been subjected to at least one in situ chemical reaction with loss of any diazonium groups which may be present, and with formation of valence links in at least mode (iii) of the modes (i), (ii) and (iii), namely:

(i) among different moieties of the at least one member between themselves;

(ii) between moieties of the at least one member and the material of the substrate; and (iii) between moieties of the at least one member and a polyfunctional reactant, the reaction in this case having been effected so as to leave residual reactive functions;

(c) a polymer which contains functions selected from the group consisting of cations, anions, —NH—, —NH—, —OH and —SH, and which is selected from hydrophilic and polyelectrolyte polymers, which polymer has been reacted with the residual functions and subsequently has been subjected to reaction with at least one crosslinking agent.

Of course, if the composite membrane of the invention is to be subject to severe pressure in use, then it can be protected by (e.g.) nonwoven supports, supports made of textile fibers or paper, wire screens or perforated plates or tubes (modules).

The pore size can be varied within the range previously indicated by, e.g., subjecting the membrane to a heat treatment, such as at a temperature within the range of 50° to 150° C., at any suitable stage, before or after modification by application of the polymer layers as described herein. By this means, the rejection and flux characteristics of the composite membranes may also be varied.

Compared with known modified membranes, the inventive membranes show good resistance to pressure, solvents, pH and temperature. Exemplary applications set out below, of the composite membranes of the present invention, are particularly advantageous, and in principle these applications generally concern the separation of monovalent ions of low ionic weight either from polyvalent ions of low or relatively high ionic weight, or from monovalent ions of relatively high ionic weight. Also, the present composite membranes may be applied to the separation of ionic substances from non-ionic substances, or of ionic compounds of different molecular weights or of opposite charge.

The separation process (RO or UF) for concentrating and/or purifying liquids, or separating components dissolved in these liquids, comprises disposing a solution on one side of the composite membrane of the present invention and applying a hydraulic pressure which is greater than the osmotic pressure of the solution, to the solution and to the membrane. Examples of separation processes to which the present composite membranes may be applied are the following:

1. The separation of organic and metal-organic ionic substances from by-products of a reaction mixture, and from other substances contained therein, e.g. from salts such as NaCl, Na$_2$SO$_4$ or sodium acetate.

2. The purification of effluents which are obtained from chemical processes and/or from the production and use of dyes and fluorescent brighteners.

3. The separation of ionic molecules (salts from aqueous solutions) i.e. the concentration of aqueous solutions which contain metal complexes, surfactants, dyes or proteins, the results obtained in this case being better with regard to efficiency (permeability, i.e. flux per unit time as well as the separating effect) than when using known membranes.

The separation effect (rejection) of the membranes can be measured as follows. A circular membrane with a surface area of 13 cm.$^2$, resting on a sintered stainless steel disc, is used in a cylindrical cell made of stainless steel. 150 ml. of the solution (to be tested) which contains the solute to be tested in a concentration $C^1$ (g. solute/g. solution) are introduced onto the membrane in the steel cylinder and subjected to a pressure ($N_2$) of 14 bars. The solution is stirred magnetically. The concentration ($C^2$) of the liquid which collects on the outlet side of the membrane is determined, 3 samples of 5 ml. each being taken from the start of the experiment. In general, the amount which flows through the membrane and the composition of the 3 samples are constant. The rejection (R) can be calculated from the values obtained using the equation:

$$R(\%) = (C^1 - C^2) \times 100/C^1.$$

The amount of material (F=flux) passing through the membrane per surface and time unit is determined from the equation:

$$F = V \times S^{-1} \times t^{-1}$$

where V=volume, S=membrane surface area and t=time. F may be expressed in terms of cubic meters of solution per square meter surface area of membrane per day, or in terms of liters of solution per square meter surface area of membrane per hour.

In addition to measurements on flat membranes, measurements on tubular membranes 60 cm. long and with an outer diameter of 1.4 cm. were also carried out. For this purpose the tubular membranes were placed in a perforated tube made of stainless steel. The whole is then placed in a tube made of polycarbonate. The outflow from the membrane is between this outer polycarbonate tube and the steel tube. The liquid is added as a stream of solution in turbulent or laminar flow under pressure. The flow rate is kept constant at 10–15 liters per minute. The rejection (R) and the flux (F) are calculated in a similar manner as before.

In the following Examples, the dyes and colorless compounds of formulae (21) to (25) are used as reactive agents for crosslinking and incorporating ionic groups in the composite membrane, while dyes of formulae (26) and (27) are used in test solutions.

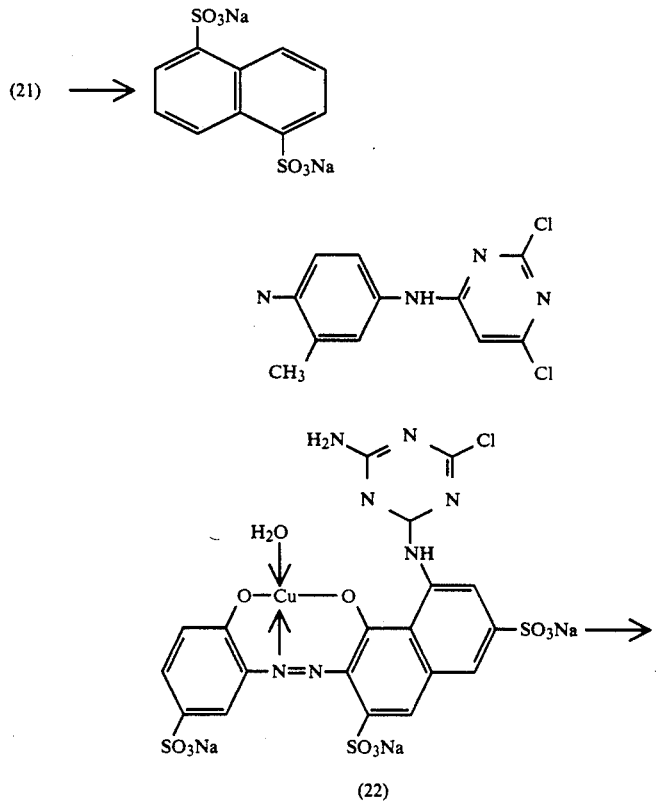

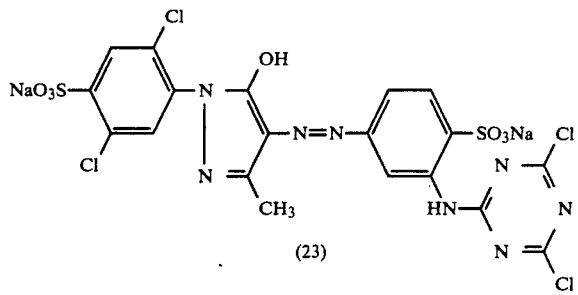

(23)

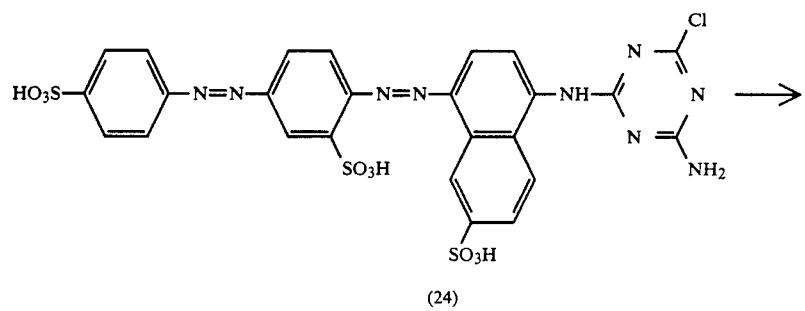

(24)

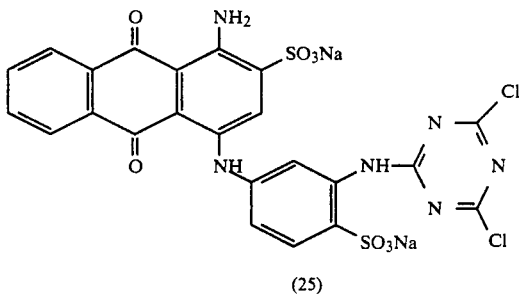

(25)

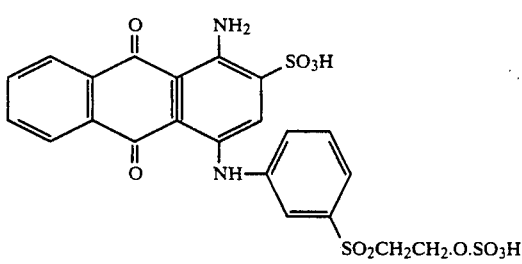

(26)

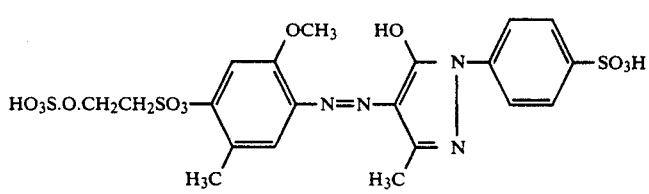

(27)

EXAMPLE I

A polysulfone membrane made from a polymer (MW ≈ 42,000) of the following structure (where $C_6H_4$ is p-phenylene and Me is methyl)

—[—$C_6H_4$—$CMe_2$—$C_6H_4$—O—$C_6H_4$—$SO_2C_6H_4$—]$_n$— and having a flux/rejection profile for various solutes as described in Table 1, was modified by the following procedure.

The membrane was immersed for 30 minutes in an aqueous solution of $NaNO_2$ and 0.5% polyethyleneimine (average MW about 30,000), which had been adjusted to pH 0.5 with HCl, then removed and immersed for 30 minutes in an aqueous bath at pH 12, and rinsed for 30 minutes with tap water. It was then immersed for 10 minutes in a 2% aqueous suspension of cyanuric chloride at 0°–4° C. and washed for 10 minutes with ice water. The next step was immersion for 5 minutes in a 10% aqueous solution of polyethyleneimine (average MW about 30,000) at pH 8.5, followed by washing with tap water for 2 hours. It was then immersed for 15 minutes in a bath containing 1% of reactive dye (21) and 10% NaCl, drip dried for 10 seconds, immersed for 30 minutes in a 2% NaHCO$_3$ bath at room temperature, and washed for 10 minutes with tap water. The performance of the modified membrane is set out in Table 1.

TABLE 1

| Solute | Solute concn. % | Before modification | | After modification | |
|---|---|---|---|---|---|
| | | Rejection % | Flux* | Rejection % | Flux* |
| Dye (27) | 1.5 | 42 | 220 | 99.9 | 82 |
| Dye (26) | 2.0 | 60 | 65 | 99 | 42 |
| Congo Red | 1.0 | 30 | 200 | 99.6 | 94 |
| p-TsOH | 1.0 | 12 | 95 | 17 | 130 |
| NaCl | 1.0 | 0 | 235 | 5 | 116 |
| Dinitrostilbene disulfonic acid | 1.0 | 48 | 130 | 94 | 120 |

*l./m$^2$ · h
Testing conditions: pH value 6.5; 30° C.; 25 bar; flat sheets.

EXAMPLE II

A composite membrane similar to that of Example I was prepared, except that the substrate membrane was fabricated from sulfonated polyether ketone, with a rejection to the dye of formula (27) of 20%. The composite membrane showed a flux and rejection to the dye (5%, 20 bar, pH 7.0) of 99.9% and 65 l./m$^2$.h, respectively. A tubular membrane made of the same polymeric material and modified in the same manner, showed a rejection to dye of formula (27) of 99.6%. Rejection to dinitrostilbenedisulfonic acid increased from 5% (unmodified membrane) to 94% for the modified membrane.

EXAMPLE III

A tubular polysulfone membrane with repeating units of the formula

was modified according to the procedure of Example I. The rejection and flux of the unmodified and modified membranes to the dye of formual (27) (5%) at 20 bar in a flat test cell were 68, 122 l./m$^2$.d and 98.6, 156 l./m$^2$.d, respectively.

EXAMPLE IV

When in Example I, other amines are substituted for polyethyleneimine, the results as set out in Table 2 were obtained.

TABLE 2

| Amine treated with nitrous acid | Rejection % | Flux* |
|---|---|---|
| Polyvinylamine-HCl (MW 50,000) | 99.1 | 123 |
| Polyvinylamine/vinylsulfonate (80:20) (MW 40,000) | 99.9 | 35 |
| Metaphenylenediamine | 99.8 | 196 |
| Polyvinylaniline | 99.2 | 83 |

*l./m$^2$ · h
Testing conditions: 5% dye (27); 30° C.; 25 bar.

When Example IV was repeated with the same first coating material, but using polyvinylamine instead of polyethyleneimine as the second coating polymer, the resultant composite membranes had above 96% rejection to dye (27).

EXAMPLE V

Example IV was repeated using instead of polyethyleneimine as the initial coating amine to be treated with nitrous acid, polyvinylamine/vinylsulfonate (80:20) (MW 40,000), and also replacing the substrate by one fabricated from polyacrylonitrile. After modification, the rejection increased to 98.6% from 45% for the unmodified membrane.

EXAMPLE VI

Example I was repeated with the exception that the step of reaction with the dye of formula (21) was replaced by reaction with compounds of formulae (22) to (25) inclusive. All the resulting composite membranes had rejections above 98% to the dye of formula (27) at 25 bars and 30° C., with fluxes above 50 l./m$^2$.h.

EXAMPLE VII

The procedure of Example I was repeated using sulfonated polyvinylidene fluoride of molecular weight 100,000 instead of polysulfone, for the substrate. The unmodified membrane had a rejection to solute of formula (27) of 65%; after modification, rejection was 97%.

EXAMPLE VIII

The procedure of Example I was repeated, using for the second coating polymer polyvinylamine, polyacrylaniline/vinyl sulfonate copolymer, polydiallylamine, or polyethyleneimine MW 1000. The resultant composite membranes all had rejection of more than 98% to solute (21), less than 20% to NaCl and fluxes above 500 l./m$^2$.d.

EXAMPLE IX

Example I was repeated using an aromatic polyamide instead of polysulfone to make the initial substrate. The membrane had a rejection to dye of formula (27) of 20%; after modification rejection was 99.5%, with a flux of 900 l./m$^2$.d.

EXAMPLE X

Example I was repeated using an aluminum oxide ceramic support having a rejection to dye of formula (27) of 10%; after modification, rejection was 98% with a flux of 200 l./m$^2$.d.

EXAMPLE XI

Example I was repeated with the difference that the membrane substrate was first coated with the polyethyleneimine solution (0.5%), drained and then immersed in the nitrous acid solution, prior to repeating all of the subsequent steps. The resulting composite membrane had a rejection to dye of formula (27) of 99%, with a flux of 850 l./m$^2$.d.

While the invention has been particularly described with respect to specified embodiments, it will be evident to those skilled in the art that many variations and modifications are possible. Accordingly, the invention is not to be construed as limited to such embodiments, rather its scope and spirit are to be understood with reference to the claims which follow.

We claim:

1. A composite membrane which comprises
   (a) a porous semipermeable membrane substrate selected from the group consisting of cellulosics, polyacrylonitriles, polyamides, polyvinylidene fluorides, polytetrafluoroethylenes, polyetherketones and ceramics,
   (b) a coating superimposed thereon which includes at least one member selected from the group consisting of
       monomers containing at least one diazonium group,
       polymers containing at least one diazonium group,
       monomers containing at least one primary amino group and which have been exposed to the action of at least one member selected from the group consisting of nitrous acid and other reagents which potentially react with primary amino groups to form diazonium groups, and
       polymers containing at least one primary amino group and which have been exposed to the action of at least one member selected from the group consisting of nitrous acid and other reagents which potentially react with primary amino groups to form diazonium groups, and
       wherein said coating has been subjected to at least one in situ chemical reaction with loss of any diazonium groups which may be present, and with formation of valence links in at least one of the modes (i), (ii) and (iii), namely:
       (i) among different moieties of said at least one member between themselves,
       (ii) between moieties of said at least one member and the material of the substrate, and
       (iii) between moieties of said at least one member and a polyfunctional reactant in such manner as to leave residual reactive functions, and said residual reactive functions have been subsequently reacted with,
   (c) a polymer selected from the group consisting of hydrophilic and polyelectrolyte polymers.

2. A composite membrance according to claim 1, wherein following said reaction step (c), said polymer has also been subjected to a cross-linking reaction.

3. A composite membrane according to claim 1, wherein said coating has been coated onto substantially the whole of the external and internal surfaces of a substrate.

4. A composite membrane according to claim 1, wherein said substrate has been prepared by casting from solution onto a porous support material.

5. A composite membrane according to claim 1, wherein said at least one in situ chemical reaction has been effected in at least mode (iii), and said chemical reaction with said polyfunctional reactant has been carried out in such manner as to leave residual reactive functions; and wherein said composite membrane further comprises:
   (c) a polymer selected from the group consisting of hydrophilic and polyelectrolyte polymers, which polymer has been reacted with said residual functions and subsequently has been subjected to reaction with at least one cross-linking agent.

6. A composite membrane according to claim 5, wherein said coating has been coated onto substantially the whole of the external and internal surfaces of said substrate.

7. A composite membrane according to claim 5, wherein said polymer contains functions selected from the group consisting of cations, anions, —NH—, —NH$_2$—, —OH and —SH.

8. A composite membrane according to claim 5, wherein said substrate has been prepared by casting from solution onto a porous support material.

9. A composite membrane according to claim 5, wherein at least one of components (b) and (c) is derived from polyethyleneimine.

10. A composite membrane according to claim 9, wherein both components (b) and (c) are derived from polyethyleneimine.

11. A composite membrane according to claim 5, wherein at least one of said polyfunctional reactant and said cross-linking agent includes a reactive dye.

12. A composite membrane according to claim 5, wherein the constitution of at least one member of the group consisting of component (b), said polyfunctional reactant, said polymer (c) and said cross-linking agent is such that the composite membrane product contains more ionic groupings than were present (if any) in said porous semipermeable membrane substrate.

13. A composite membrane which comprises
    (a) a porous semipermeable membrane substrate of an aromatic polysulfone, and
    (b) a coating superimposed thereon which includes at least one member selected from the group consisting of
        polymers containing at least one diazonium group,
        polymers containing at least one primary amino group and which have been exposed to the action of at least one member selected from the group consisting of nitrous acid and other reagents which potentially react with primary amino groups to form diazonium groups, and
        wherein said coating has been subjected to at least one in situ chemical reaction with loss of any diazonium groups which may be present, and with formation of valence links in at least one of the modes (i), (ii) and (iii), namely:
        (i) among different moieties of said at least one member between themselves,
        (ii) between moieties of said at least one member and the material of the substrate, and
        (iii) between moieties of said at least one member and a polyfunctional reactant in such manner as to leave residual reactive functions, and said residual reactive functions have been subsequently reacted with,
    (c) a polymer selected from the group consisting of hydrophilic and polyelectrolyte polymers.

14. A composite membrane according to claim 13, wherein following said reaction with residual reactive functions, said polymer has also been subjected to a cross-linking reaction.

15. A composite membrane according to claim 13, wherein said substrate has been prepared by casting from solution onto a porous support material.

16. A composite membrane according to claim 13, wherein said polymer (c) contains functions selected from the group consisting of cations, anions, —NH—, —NH$_2$—, —OH and —SH.

17. A composite membrane according to claim 13, wherein at least one of components (b) and (c) is derived from polyethyleneimine.

18. A composite membrane according to claim 17, wherein both components (b) and (c) are derived from polyethyleneimine.

19. A composite membrane according to claim 13, wherein at least one of said polyfunctional reactant and said cross-linking agent includes a reactive dye.

20. A shaped composite membrane which comprises
(a) a porous semipermeable membrane substrate selected from the group consisting of cellulosics, polyacrylonitriles, polyamides, polyvinylidene fluorides, polytetrafluoroethylenes, polyetherketones and ceramics,
(b) a superimposed coating thereon which has been coated onto substantially the whole of the external and internal surfaces of said substrate, said coating including at least one member selected from the group consisting of
monomers containing at least one diazonium group,
polymers containing at least one diazonium group,
monomers containing at least one primary amino group and which have been exposed to the action of at least one member selected from the group consisting of nitrous acid and other reagents which potentially react with primary amino groups to form diazonium groups, and
polymers containing at least one primary amino group and which have been exposed to the action of at least one member selected from the group consisting of nitrous acid and other reagents which potentially react with primary amino groups to form diazonium groups, and wherein said coating has been subjected to at least one in situ chemical reaction with loss of any diazonium groups which may be present, and with formation of valence links in at least mode III of the modes (i), (ii) and (iii), namely:
(i) among different moieties of said at least one member between themselves,
(ii) between moieties of said at least one member and the material of the substrate, and
(iii) between moieties of said at least one member and a polyfunctional reactant, the reaction in this case having been effected so as to leave residual reactive functions, and
(c) a polymer which contains functions selected from the group consisting of cations, anions, —NH—, —NH$_2$—, —OH and —SH, and which is selected from the groups consisting of hydrophilic and polyelectrolyte polymers, which polymer has been reacted with said residual functions and subsequently has been subjected to reaction with at least one cross-linking agent.

21. A shaped composite membrane according to claim 20, wherein said substrate has been prepared by casting from solution onto a porous support material.

22. A shaped composite membrane according to claim 20, wherein at least one of components (b) and (c) is derived from polyethyleneimine.

23. A shaped composite membrane according to claim 22, wherein both components (b) and (c) are derived from polyethyleneimine.

24. A shaped composite membrane according to claim 20, wherein at least one of said polyfunctional reactant and said cross-linking agent includes a reactive dye.

25. A shaped composite membrane according to claim 20, wherein said at least one in situ chemical reaction has been effected in all three modes (i), (ii) and (iii).

26. A shaped composite membrane according to claim 20, wherein the constitution of at least one member of the group consisting of component (b), said polyfunctional reactant, said polymer (c) and said cross-linking agent is such that the composite membrane product contains more ionic groupings than were present (if any) in said porous semipermeable membrane substrate.

27. A shaped composite membrane which comprises
(a) a porous semipermeable membrane substrate of an aromatic polysulfone,
(b) a superimposed coating thereon which has been coated onto substantially the whole of the external and internal surfaces of said substrate, said coating including at least one member selected from the group consisting of
polymers containing at least one diazonium group,
polymers containing at least one primary amino group and which have been exposed to the action of at least one member selected from the group consisting of nitrous acid and other reagents which potentially react with primary amino groups to form diazonium groups, and wherein said coating has been subjected to at least one in situ chemical reaction with loss of any diazonium groups which may be present, and with formation of valence links in at least mode (iii) of the modes (i), (ii) and (iii), namely:
(i) among different moieties of said at least one member between themselves,
(ii) between moieties of said at least one member and the material of the substrate, and
(iii) between moieties of said at least one member and a polyfunctional reactant, the reaction in this case having been effected so as to leave residual reactive functions, and
(c) a polymer which contains functions from the group consisting of cations, anions, —NH—, —NH$_2$—, —OH and —SH, and which is selected from the group consisting of hydrophilic and polyelectrolyte polymers, which polymer has been reacted with said residual functions and subsequently has been subjected to reaction with at least one cross-linking agent.

28. A reverse osmosis or ultrafiltration process which comprises the steps of:
disposing a solution on one side of a composite membrane as solution which it is desired to concentrate or resolve into components;
applying a hydraulic pressure which is greater than the osmotic pressure of the solution; and
recovering at least one member selected from the group consisting of solution which has passed through said membrane and solution which has remained on the said one side of said membrane;
and wherein said composite membrane comprises the following components (a), (b) and (c), namely:
(a) a porous semipermeable membrane substrate selected from the group consisting of cellulosics, polyacrylonitriles, polyamides, polyvinylidene fluorides, polytetrafluoroethylenes, polyetherketones and ceramics,
(b) a superimposed coating thereon which has been coated onto substantially the whole of the external and internal surfaces of said substrate, said coating including at least one member selected from the group consisting of
monomers containing at least one diazonium group,
polymers containing at least one diazonium group, monomers containing at least one primary amino group and which have been exposed to the action of at least one member selected from the group consisting of nitrous acid and other reagents which potentially react with primary amino groups to form diazonium groups, and polymers containing at least one primary amino group and which have been exposed to the action of at least one member selected from the group consisting of nitrous acid and other reagents which potentially react with primary amino groups to form diazonium groups, and wherein said coating has been subjected to at least one in situ chemical reaction with loss of any diazonium groups which may be present, and with formation of valence links in at least one of the modes (i), (ii) and (iii); namely:

(i) among different moieties of said at least one member between themselves, (ii) between moieties of said at least one member and the material of the substrate, and (iii) between moieties of said at least one member and a polyfunctional reactant, the reaction in this case having been effected so as to leave residual reactive functions, and (c) a polymer which contains functions selected from the group consisting of cations, anions, —NH—, —NH$_2$—, —OH and —SH, and which is selected from the group consisting of hydrophilic and polyelectrolyte polymers, which polymer has been reacted with said residual functions and subsequently has been subjected to reaction with at least one cross-linking agent.

29. A process according to claim 28, which is applied to the separation from a solution of at least one member selected from the group consisting of organic and metal-organic ionic substances.

30. A process according to claim 28, which is applied to the purification of effluents from chemical processes.

31. A process according to claim 28, which is applied to the purification of effluents obtained from the production and use of at least one substance selected from the group consisting of dyes and fluorescent brighteners.

32. A process according to claim 28, which is applied to the separation of inorganic ions from aqueous solutions.

33. A process according to claim 28, which is applied to the concentration of aqueous solutions which contain at least one substance selected from the group consisting of metal complexes, surfactants, dyes and proteins.

34. A reverse osmosis or ultrafiltration process which comprises the steps of:

disposing a solution on one side of a composite membrane as solution which it is desired to concentrate or resolve into components;

applying a hydraulic pressure which is greater than the osmotic pressure of the solution; and recovering at least one member selected from the group consisting of solution which has passed through said membrane and solution which has remained on the said one side of said membrane;

and wherein said composite membrane comprises the following components (a), (b) and (c), namely:

(a) a porous semipermeable membrane substrate of an aromatic polysulfone, (b) a superimposed coating thereon which has been coated onto substantially the whole of the external and internal surfaces of said substrate, said coating including at least one member selected from the group consisting of polymers containing at least one diazonium group, and polymers containing at least one primary amino group and which have been exposed to the action of at least one member selected from the group consisting of nitrous acid and other reagents which potentially react with primary amino groups to form diazonium groups, and wherein said coating has been subjected to at least one in situ chemical reaction with loss of any diazonium groups which may be present, and with formation of valence links in at least one of the modes (i), (ii) and (iii); namely:

(i) among different moieties of said at least one member between themselves, (ii) between moieties of said at least one member and the material of the substrate, and (iii) between moieties of said at least one member and a polyfunctional reactant, the reaction in this case having been effected so as to leave residual reactive functions, and (c) a polymer which contains functions selected from the group consisting of cations, anions, —NH—, —NH$_2$—, —OH and —SH, and which is selected from the group consisting of hydrophilic and polyelectrolyte polymers, which polymer has been reacted with said residual functions and subsequently has been subjected to reaction with at least one cross-linking agent.

* * * * *